3,133,018
METHOD OF RECOVERING THE SOLVENT FOR ACRYLONITRILE POLYMER FROM AN AQUEOUS SOLUTION THEREOF
Masamoto Watanabe, Kyoto, and Tadao Yamada, Hideo Sakai, and Masao Takahashi, Shiga-ken, Japan, assignors to Toyo Rayon Kabushiki Kaisha, Tokyo, Japan, a corporation of Japan
No Drawing. Filed Apr. 11, 1962, Ser. No. 186,641
Claims priority, application Japan Apr. 17, 1961
11 Claims. (Cl. 210—21)

This invention relates to a method of separating and recovering an acrylonitrile polymer solvent from an aqueous solution thereof, e.g., an aqueous solvent solution that is recovered during the process of spinning acrylonitrile fibers. More particularly, it relates to a method of recovering an acrylonitrile polymer solvent from an aqueous solution thereof which comprises adding to said aqueous solvent solution of an inorganic salt represented by the following general formula:

$$K_l H_m MO_n$$

wherein M is an element of either group IV or V of the periodic table having an atomic number of at least about 14, $l$ and $n$ are positive integers, and $m$ is either zero or a positive integer.

Heretofore, in the wet spinning of acrylonitrile fibers the solvents for acrylonitrile polymer, for example, dimethylsulfoxide and dimethylformamide, were recovered in the form of an aqueous solution thereof. In recovering the solvent from such aqueous solvent solutions, due to the relatively great affinity of dimethylsulfoxide and dimethylformamide to water, and dimethylformamide, the method heretofore practiced was generally that in which the solvent was separated by distilling the aqueous solution. On the other hand, when dimethylformamide or ethylene carbonate was used, potassium carbonate ($K_2CO_3$) has been employed to aid in the salting and separation of the solvent solution.

However, these conventional methods are not necessarily satisfactory in that either the results of the separation are not completely satisfactory or the separating operations are troublesome. As a result of our researches for a method of recovery in which the solvent advantageously and readily could be separated and recovered from such an aqueous solution of the solvent for acrylonitrile polymer on a commercial scale and moreover in which preferably the spinning operation could be carried out while effecting the continuous recovery of the solvent, we found that by dissolving an inorganic salt corresponding to the above formula in the aqueous solution of the solvent for acrylonitrile polymer, the treated aqueous solvent solution subsequently separated upon standing into two layers, one layer consisting of the polymer solvent and the other layer being an aqueous solution of the inorganic salt treating agent, thereby readily accomplishing the recovery of the solvent with high purity. In addition, we found that by lowering the temperature of the aqueous inorganic salt solution, the organic salt could be readily separated from the solution and that by recycling and reusing the so obtained inorganic salt the spinning operation could be carried out while continuously recovering the solvent.

Accordingly, the primary object of the present invention is to provide a method of advantageously and readily recovering an acrylonitrile polymer solvent of high purity from an aqueous solution thereof.

Another object of the invention is to provide a method of recovering acrylonitrile polymer solvent from aqueous solutions thereof which are obtained in continuous polyacrylonitrile fiber spinning operations.

Other objects and advantages of this invention will become apparent from the following description thereof.

While the inorganic salts to be used in this invention may be any that are represented by the following general formula:

$$K_l H_m MO_n$$

wherein M is an element of group IV or V of the periodic table having an atomic number of at least about 14, $l$ and $n$ are positive integers, and $m$ is either zero or a positive integer; from the standpoint of ease of recovery as well as preparation and handling of the inorganic salt, $K_3PO_4$, $KH_2AsO_4$, and the like are preferred. Specific examples of other suitable potassium salts include $K_4TiO_4$, $K_2TiO_3$, $K_4TiO_5$, $K_2ZrO_3$, $K_4ZrO_4$, $K_2SiO_3$, $K_4SiO_4$, $K_4PbO_4$, $K_2PbO_3$, $K_3VO_4$, $KVO_3$, $KH_2PO_4$, $K_2HPO_4$, $K_3PO_4$, $K_4P_2O_7$, $KPO_3$, $KHPO_3$, $KPO_2$, $KH_2PO_2$, $KSbO_4$, $K_3SbO_4$, $K_2H_2Sb_2O_7$, etc.

In adding the inorganic salts used in the invention to the aqueous solution of the solvent for acrylonitrile polymer, they suitably may be added in the form of their respective aqueous solutions. However because it is more desirable from the standpoint of recovery rate to utilize enough of the inorganic salt to saturate the water contained in the aqueous acrylonitrile polymer solution, addition of the inorganic salt in dry form is preferred. In adding, they are dissolved by thorough stirring, it being possible to utilize any of the normally practiced stirring means. When the resulting treated liquid is allowed to stand after stirring and dissolution, it separates into two layers, the upper layer being the solvent layer and the lower, the aqueous solution layer of the inorganic salt.

Normally, when polyacrylonitrile fibers are wet-spun, the solvent used for the acrylonitrile polymer in the spinning process includes such as dimethyl sulfoxide, dimethylformamide, ethylene carbonate, etc., all of which are readily recoverable by the method of this invention.

In addition, when the polyacrylonitrile solution obtained by the solution polymerization method is spun, needless to say, the unpolymerized acrylonitrile that is mixed in the aqueous solution can also be separated and recovered together with the polymer solvent, by the method of this invention.

The actual quantity of the above-described inorganic salts added to the aqueous solvent solutions depends upon the solubility of the salts, the quantity of water contained in the aqueous solution, and the particular temperature of the aqueous solution. The amount of inorganic salts required for separation operations increases as the content of the solvent in the aqueous solution becomes small. In order to carry out as completely as possible the separation into the solvent layer and aqueous inorganic salt solution layer, it is preferred that the addition of the inorganic salts be of a quantity that is sufficient to saturate the water contained in the aqueous solvent solution at the operational temperature. Although the operation is carried out at a temperature generally within the range of 10–80° C., depending upon the concentration of the solution, a temperature outside of this range is, of course, usable. In order that the separation and recovery of the solvent is achieved as completely as possible, it is necessary that stirring is accomplished as thoroughly as possible.

After separation of the resulting solvent and aqueous inorganic salt solution layers, since a small amount of water and inorganic salts still is present in the solvent obtained, as a final step the solvent preferably is purified by rectification. On the other hand, by lowering the temperature of the aqueous solution of inorganic salts obtained as the lower layer the solubility of the salts in the solution is lowered, whereby the inorganic salts can be precipitated, recovered and reused. Therefore, the method of the present invention has the advantage in providing that a given amount of the inorganic salt treating agent and polymer solvent can be employed in continuous polyacrylonitrile fiber spinning operations, the inorganic salt being employed to carry out a continuous separation and recovery of the solvent.

The present invention, when compared with the conventional methods, for example, the separating operation involving only distillation, is also of very great advantage from the standpoints of its heat economy, scale of the equipment and ease of operation.

For a clearer understanding of the invention, the following specific examples illustrating the mode of practicing the same are given. It is to be understood, however, that these examples are intended to be merely illustrative of and not limitative to the invention, and that many changes and modifications are possible without departing from the scope and spirit of the invention.

*Example 1*

Potassium dihydrogen arsenate ($KH_2AsO_4$) was added to 400 parts of a 20% aqueous dimethylformamide solution, at 20° C. and atmospheric pressure with thorough stirring, in an amount sufficient to saturate the water contained in said aqueous solution, and the resulting mixture was allowed to stand, whereupon separation thereof into two layers was effected. When the upper layer was separated, 120 parts of a 65% aqueous dimethylformamide solution were obtained.

*Example 2*

Potassium phosphate ($K_3PO_4$) was added to 167 parts of a 40% aqueous dimethyl sulfoxide solution containing 1.5% of acrylonitrile in the dimethyl sulfoxide, at 20° C. and atmospheric pressure with thorough stirring, in an amount sufficient to saturate the water contained in said aqueous solution, and the resulting mixture was allowed to stand, whereupon separation thereof into layers was effected. When the upper layer was separated, 71 parts of a 85% aqueous dimethyl sulfoxide solution containing 1.5% of acrylonitrile were obtained.

Having thus set forth the nature of the invention, what we claim is:

1. A method for separating and recovering a solvent selected from the group consisting of dimethylformamide, dimethylsulfoxide and ethylene carbonate from an aqueous solution of said solvent which comprises adding to said aqueous solution an inorganic potassium salt represented by the formula $$K_lH_mMO_n$$

wherein M is an element having an atomic number of at least about 14 selected from the group consisting of elements of group IV and elements of group V of the periodic table, $l$ and $n$ are positive integers, and $m$ is selected from the group consisting of zero and positive integers, to effect the separation of said aqueous solvent solution into two layers consisting of a layer of said solvent and a layer of an aqueous solution of said potassium salt and separating said two layers.

2. The method according to claim 1 wherein said aqueous solvent solution is obtained in an acrylonitrile polymer spinning process.

3. The method according to claim 1 wherein said aqueous solvent solution is at a temperature in the range of from about 10° to about 80° C.

4. The method according to claim 1 wherein subsequent to the separation of said two layers, said aqueous solution of potassium salt is cooled to effect the precipitation of said potassium salt, said precipitated potassium salt is recovered therefrom and thereafter is recycled to contact additional aqueous solvent solution.

5. The method according to claim 1 wherein M is an element of group V of the periodic table having an atomic number in the range of from 15 to 51.

6. The method according to claim 5 wherein said potassium salt is $KH_2AsO_4$.

7. The method according to claim 6 wherein said solvent is dimethylformamide.

8. The method according to claim 6 wherein said solvent is dimethylsulfoxide.

9. The method according to claim 5 wherein said potassium salt is $K_3PO_4$.

10. The method according to claim 9 wherein said solvent is dimethylformamide.

11. The method according to claim 9 wherein said solvent is dimethylsulfoxide.

References Cited in the file of this patent

UNITED STATES PATENTS

| | | |
|---|---|---|
| 2,124,814 | De Stagni | July 26, 1938 |
| 2,167,327 | Talley et al. | July 25, 1939 |
| 2,544,385 | Hochwalt | Mar. 6, 1951 |
| 2,902,335 | Sakurai et al. | Sept. 1, 1959 |